Jan. 21, 1969    C. L. E. MARCHERON    3,422,936
SECTOR TYPE FRICTION BRAKE DISC

Filed April 28, 1967

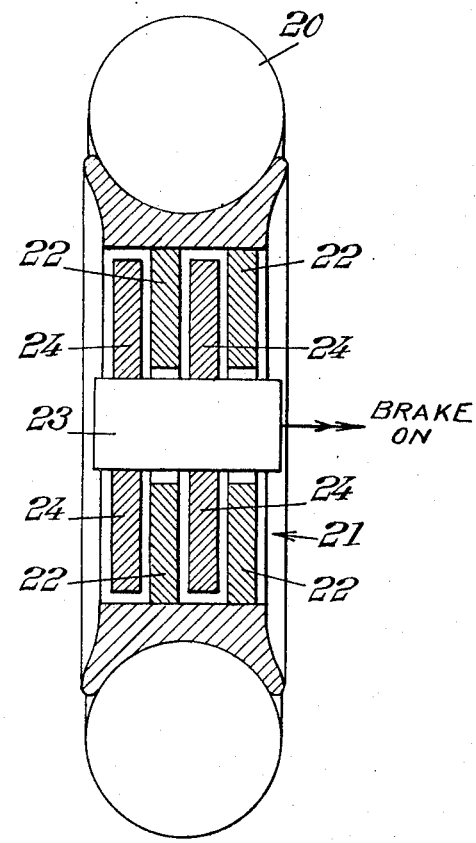

United States Patent Office 3,422,936
Patented Jan. 21, 1969

3,422,936
SECTOR TYPE FRICTION BRAKE DISC
Claude Louis Edouard Marcheron, Montrouge, France, assignor to Societe Hispano-Suiza-Lallemant, Bois-Colombes, France
Filed Apr. 28, 1967, Ser. No. 634,662
Claims priority, application France, May 5, 1966, 60,379
U.S. Cl. 188—218        4 Claims
Int. Cl. F16d 65/2

ABSTRACT OF THE DISCLOSURE

Improved friction disc brake wherein at least one of the annular friction discs is formed by a plurality of sectors arranged about an axis, each sector being interconnected to adjacent sectors by a tooth and recess arrangement which includes sufficient clearance to allow circumferential play between adjacent sectors. A securing mechanism may be provided including a pin passing radially through a set of generally coaxial apertures in the tooth and the radial inner and/or outer sides of the recess, the cross-section of the pin being less than that of the apertures.

Background—Field of the invention

This invention relates to disc brakes of the kind which comprise at least one friction disc, that is, at least one disc, either rotating or non-rotating, fitted or not, with linings on one or the other of its two faces and designed to frictionally cooperate with at least one other element with which one of its faces is brought into contact and relative to which it possesses a rotation speed, and the invention relates particularly, although not exclusively, to aircraft landing-gear disc brakes.

Background—Description of the prior art

In the operation of disc brakes, the frictional discs are subjected to overall heating which causes the temperature of the disc to increase. However, this temperature rise will vary at different parts of the disc. In disc brakes of the type known heretofore, upon protracted braking action these large and non-uniform temperature changes created internal stresses in the disc, thus causing distortion of the disc—for example, by warping, coning, or the like—thus seriously impairing the efficacy of the braking action.

Consequently, there exists a need for an improved disc brake which will operate efficiently notwithstanding large and non-uniform temperature changes in the frictional discs.

Summary of the invention

A purpose of the present invention is to provide a disc brake which overcomes the disadvantages of the prior art by providing an improved friction disc formed as a plurality of separate sectors interconnected by an assembly means permitting a degree of circumferential play between the sectors.

Accordingly, the facing radial edges of any two adjacent disc sectors are formed respectively with a male portion and with a female portion adapted to engagingly cooperate therewith, each of these sectors being set angularly into the same rotating or non-rotating structure of the brake.

The male portion of each sector comprises at least one tooth the inner and outer flanks of which are perpendicular to the disc radius passing through the zone of mutual engagement of the two adjacent sectors being considered, while the female portion of each sector comprises a recess of shape matching that of said tooth and the inner and outer flanks of which are accordingly perpendicular to said radius, whereby when the male portion of one of the sectors cooperates with the female portion of the adjacent sector, the two sectors may undergo uniquely tangential relative shifts of amplitude dependent on the circumferential clearance conferred upon the disc by the sector assembly means.

Brief description of the drawings

It is to be understood that the detailed description to follow, together with the accompanying drawings, are intended for the purpose of illustrating preferred embodiments of the invention. However, it is to be understood that these preferred embodiments are capable of modifications and variations apparent to those skilled in the art without departing from the spirit and scope of the invention as defined in the claims.

In the drawings:

FIGURE 4, illustrates schematically, a wheel and disc brake arrangement of the type in which the friction discs of the present invention may be employed.

Description of the preferred embodiments

The subject disc brake of this invention may be devised in any convenient manner provided only that it comprises at least one disc participating in the rotation of the wheel to be braked (that is a rotating friction disc), adapted to frictionally cooperate, subsequent to a relative axial shift, with at least one angularly motionless disc (that is, with a non-rotating friction disc), one or both of these discs being possibly provided with friction linings on its or their working face or faces.

The principal feature of the invention, to which reference will be made hereinafter, can be embodied in any friction disc used in a disc brake, that is, in a rotating or non-rotating disc provided or not with one or more linings.

Figure 1:
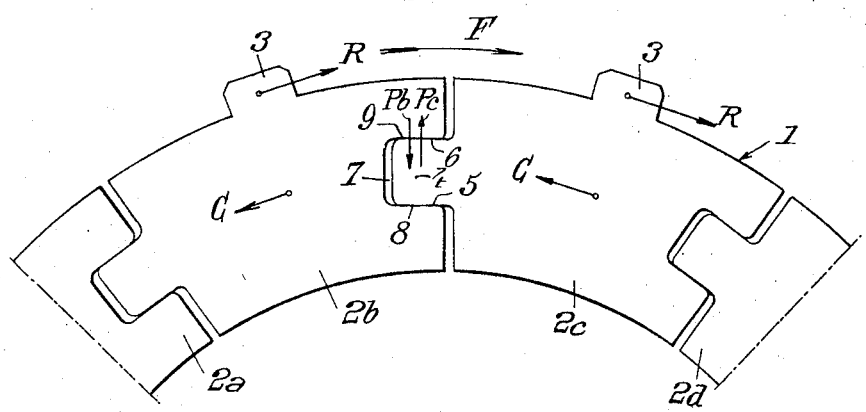
FIGURE 1 is a diagrammatic side elevation view of part of a friction disc for a landing-gear disc brake according to the invention.
Figure 2:
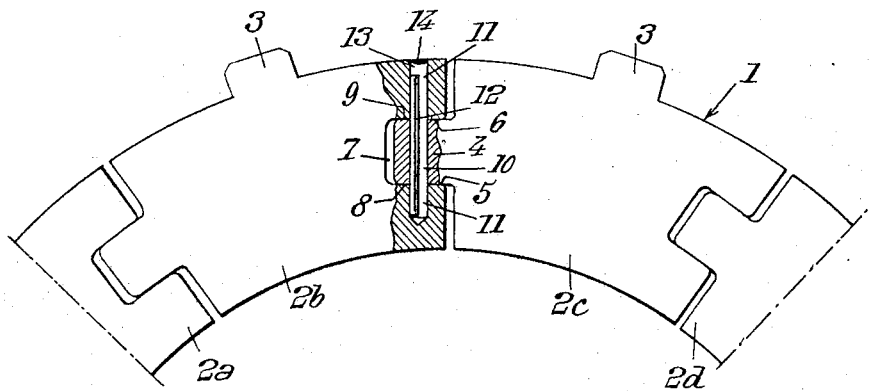
FIGURE 2 shows fragmentally in side elevation part of a friction disc for a landing-gear disc brake devised in accordance with a specific embodiment of the invention.

Said principal feature will first be considered in its application to a rotating friction disc devoid of friction linings and adapted to have its two sides cooperating with friction linings carried on two non-rotating discs located on either side of said friction disc and capable of being moved toward the same (see FIGURES 1 and 2).

Figure 3:
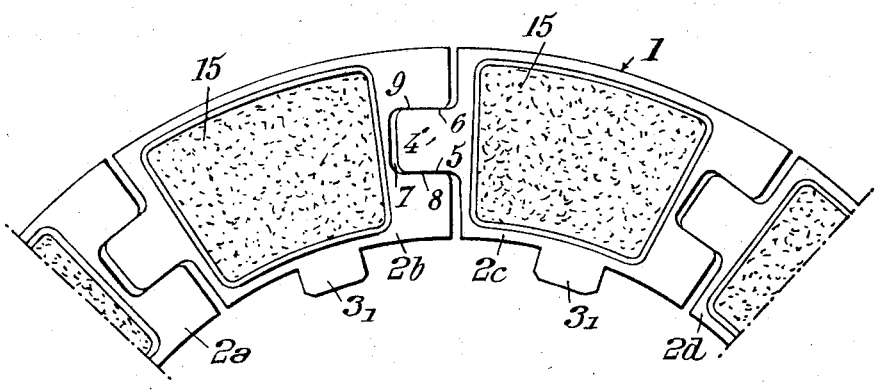
FIGURE 3 shows in side elevation an alternative embodiment of the invention.

Application of said principal feature will then be considered in the case of a non-rotating friction disc provided with linings and adapted to have its two sides cooperating with two rotating discs positioned on either side of said friction disc and capable of being moved toward the same (see FIGURE 3).

As shown in FIGURES 1–3 the present invention comprises a friction disc 1 having a plurality of separate sectors 2a, 2b, 2c, 2d, etc. interconnected by assembly means permitting a degree of circumferential play, wherefore the two facing radial edges of any two adjacent disc sectors are formed respectively with a male portion and with a female portion adapted to cooperate by mutual engagement.

In a preferred embodiment, the disc 1 is made up of eight sectors 2a, 2b, 2c, 2d, etc. Each of these sectors may be set angularly into a rotating part of the landing gear, for instance a wheel (see FIGURE 4) in the case of a rotating friction disc, and each disc sector is formed on its outer edge with a tenon 3 adapted to cooperate with a groove formed in the rim of said wheel (see FIGURES 1 and 2).

Alternatively, each sector may be set into a non-rotating part of the landing gear, such as a central tube, (see FIGURE 4) in the case of non-rotating friction disc, in which case the inner edge of each such disc sector is formed with a tension 3, adapted to cooperate with a groove formed in said central tube (see FIGURE 3).

Regardless of which of the above two constructional modes is adopted, the male portion of each sector comprises at least one tooth 4 (only one being considered in the exemplary embodiment described herein), of which the inner and outer flanks 5 and 6 are perpendicular to the disc radius passing through the zone of mutual engagement of the two adjacent sectors under consideration. The female portion of each sector comprises at least one recess 7 of shape matching that of said tooth 4 (hence one recess 7 only in the example described herein), the inner and outer flanks 8 and 9 of recess 7 being consequently perpendicular to said radius.

It will be readily appreciated that when the male portion of one of the sectors cooperates with the female portion of the adjacent sector, these two sectors will be able to undergo uniquely tangential movement relatively to each other, of amplitude dependent upon the circumferential clearance in the disc.

By virtue of this arrangement, the slewing moment to which one of the sectors is subjected is balanced by the slewing moment to which the adjacent sector is subjected.

This will be clearly apparent by referring to FIGURE 1 (which shows a rotating friction disc not fitted with linings), for if one assumes disc 1 to be rotating in the direction of arrow F, then each sector will be subjected to two categories of forces, to wit the breaking forces whose resultant is represented by arrow C and the forces due to the reaction of the wheel on tenon 3, the resultant of which is represented by arrow R.

Sector 2b tends to slew in the direction of arrow Pb and sector 2c tends to slew in the direction of arrow Pc. Being of equal and opposite magnitudes, these two slewing forces cancel out in the zone of mutual engagement of tooth 4 in recess 7, with outer tooth flank 6 thrusting against outer recess flank 9.

Were disc 1 to rotate in the opposite direction, the directions of the braking and reaction forces would be reversed and the slewing moments on the two sectors 2b and 2c would cancel out in the zone of engagement of tooth 4 in recess 7, with inner tooth flank 5 thrusting against inner recess flank 8.

While the arrangement hereinbefore described is satisfactory, it will be advantageous to have recourse to the embodiment shown in FIGURE 2, relevant to a rotating friction disc not fitted with linings, and in accordance with which, in order to prevent disengagement of two adjacent sectors during disc handling operations (as for instance during brake assembly and dismantling), provision is made for at least one securing member extending radially through both the male portion and the female portion of sectors 2a, 2b, 2c, 2d, etc. of disc 1, the assembly comprising said male and female portions and of said securing member being so devised as to permit tangential movement of two adjacent sectors relatively to each other.

Accordingly, the male portion of each sector is formed with a radially directed hole 10 extending through tooth 4 from end to end, and the female portion of each sector is formed with a radially directed hole 11 extending through both sides of recess 7. The holes 10 and 11, which are preferably of equal diameter, are so disposed that when tooth 4 is engaged into recess 7 and occupies a midway position therein (that is a position enabling the two sectors to move either toward or away from each other), said holes 10 and 11 are at least approximately coaxial.

Inserted into holes 10 and 11 is a pin 12 projecting on either side of tooth 4 and the diameter of which is less than that of said holes to an extent such as to permit tangential movement of the two adjacent sectors relatively to each other.

Preferably, pin 12 is held captive by blanking off the opening 13 of hole 11 (which opening 13 may be located either on the inner disc edge, or on the outer disc edge as shown in FIGURE 2). In cases where hole 11 extends right through the female portion of the sector for convenience in machining, then both ends of hole 11 should manifestly be blanked off.

The means used for blanking off hole 11 could be a weld spot 14, which could be readily identified should it be required to withdraw pin 12 to enable adjacent sectors to be separated.

Reference is lastly had to FIGURE 3 for an alternative embodiment in which like parts to those in FIGURE 1 are designated by like reference numerals and which illustrate a non-rotating friction disc fitted with trapezoidal friction pads 15.

It will be manifest from the foregoing that a disc brake devised in accordance with any of the forms of embodiment hereinbefore described will be capable of undergoing the functional temperature rises inherent in braking without danger of distortion.

FIGURE 4 shows, schematically, a wheel 20 having a disc brake arrangement 21 including two rotating discs 22 attached to the wheel 20, which discs, upon axial movement of the shaft 23 (to the right as shown in FIGURE 4), are frictionally engaged by non-rotating discs 24 for braking the wheel 20.

It is to be understood that either of the rotating discs 22 or the stationary discs 24 can employ the features shown in FIGURES 1–3 of the present application. It is only necessary to properly place the tenons 3 for correctly attaching the sectors to their respective support structure in the manner described earlier in this application.

I claim:

1. In a friction-disc brake comprising at least one annular friction disc having a plurality of separate sectors arranged circumferentially about the disc axis, each sector interconnected to its adjacent sectors by assembly means permitting a degree of circumferential play therebetween, the improvement wherein:

the two facing radial edges of any two adjacent disc sectors include, respectively, a male portion and a female portion adapted to cooperate by engagement with said male portion, said male portion comprising at least one tooth having radial inner and outer flanks which are substantially perpendicular to the disc radius passing through the zone of assembly of the two adjacent sectors, and said female portion of each sector comprising at least one recess of a shape matching that of said tooth and having radial inner and outer flanks which are consequently substantially perpendicular to said radius, and including a slight clearance between the circumferential end of said tooth and the circumferential bottom of said recess, and including approximately coaxial aligned apertures, extending through said tooth and the sides of said recess, at least one securing member extending radially through said apertures, the cross-section of said member being less than the cross-section of said apertures, whereby said tooth, said recess, said apertures, and said securing member are so arranged as to permit tangential movement of two adjacent sectors relative to each other, the amplitude of which movement is dependent upon the circumferential clearance imparted to said disc by said sector assembly means.

2. A brake according to claim 1 wherein said apertures include a hole formed through said tooth and through the two sides of said recess in each sector, and said securing member comprising a pin mounted in said hole to project outwardly from the radial inner and outer sides of said tooth.

3. A brake according to claim 2 including means for preventing movement of the pin out of said hole.

4. A brake according to claim 3 wherein said means for preventing movement of the pin is a weld spot blanking off a radial opening of said hole.

References Cited

UNITED STATES PATENTS

| | | |
|---|---|---|
| 2,423,882 | 7/1947 | Frank. |
| 2,778,470 | 1/1957 | Goldberg _____ 192—107 |
| 2,933,162 | 4/1960 | Trevaskis et al. _____ 188—218 |
| 3,105,575 | 10/1963 | Dewar et al. _____ 188—218 |

GEORGE E. A. HALVOSA, *Primary Examiner.*

U.S. Cl. X.R.

192—107